J. I. D. BRISTOL, H. K. CURTIS & L. T. HUNTER.
BUSHING FOR BRAKE CAMS.
APPLICATION FILED FEB. 23, 1917.
1,235,428.
Patented July 31, 1917.
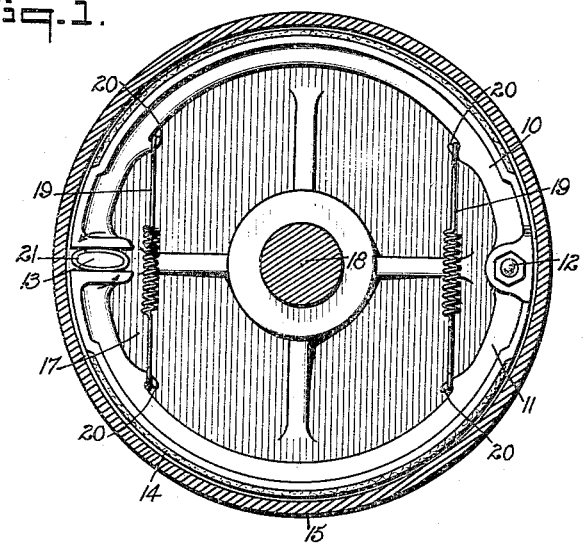
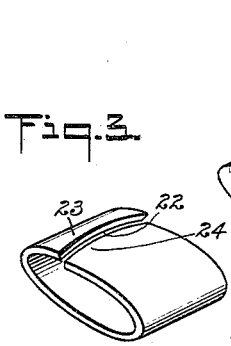
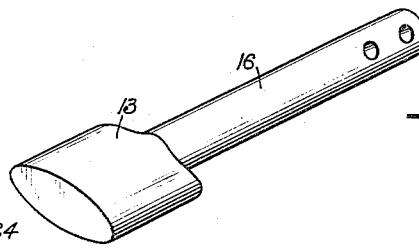
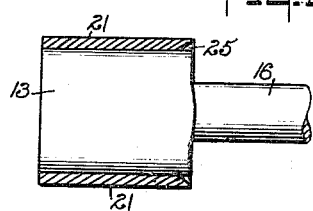
WITNESSES
INVENTORS
J.I.D.Bristol
H.K.Curtis
L.T.Hunter
BY
ATTORNEYS

UNITED STATES PATENT OFFICE.

JOHN ISAAC DEVOE BRISTOL, HORACE KEELER CURTIS, AND LOUIS TYLER HUNTER, OF CHAPPAQUA, NEW YORK.

BUSHING FOR BRAKE-CAMS.

1,235,428.  Specification of Letters Patent.  Patented July 31, 1917.

Application filed February 23, 1917. Serial No. 150,419.

*To all whom it may concern:*

Be it known that we, JOHN ISAAC DEVOE BRISTOL, HORACE KEELER CURTIS, and LOUIS TYLER HUNTER, all citizens of the United States, and residents of Chappaqua, in the county of Westchester and State of New York, have invented a new and Improved Bushing for Brake-Cams, of which the following is a full, clear, and exact description.

This invention relates to machine brakes and has particular reference to brakes adapted for automobiles or the like such as are commonly called emergency brakes.

Among the objects of this invention is to provide a means whereby the shoes of an expansion brake may be utilized until they are more nearly worn out than in accordance with the usual practice.

Another object of the invention is to provide a means whereby the rotary cam as commonly used for the expansion of the brake shoes may be supplied with a bushing or the like whereby sufficient expansion may be given to the shoes to effect the desired gripping action, even though the shoes may have become considerably worn with use.

More definitely stated, the primary object of our invention is to provide a bushing of peculiar construction that is adapted to be slipped upon the rotary cam of a hub brake, without disturbing any of the parts except the removal of the wheel or part which carries the brake drum.

A further object of the invention is to provide a means whereby the brake may be suitably corrected to render it functional without replacing the shoes when correction is required at a time or place when new shoes are not accessible.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is an outer face view of the expansion portions of the brake, the brake drum being in vertical section on a plane between the brake shoes and the wheel;

Fig. 2 is a detail view of the rotary cam journaled in the brake disk with the cam portion thereof lying normally flatly between the free ends of the brake shoes;

Fig. 3 is a detail perspective view of our improved bushing in position ready to be slipped directly upon the cam, and Fig. 4 is a plan view of the cam indicating our improved bushing applied thereto, the bushing being in section.

Referring now more particularly to the drawings, we show in Fig. 1 a well known type of automobile emergency brake, the same comprising a pair of shoes 10 and 11 hinged together at one end at 12 and having a cam 13 located between the opposite free ends. These shoes are approximately semi-circular in form and have their outer surfaces provided with suitable frictional material 14 adapted to bear frictionally against the inner surface of the hub brake drum 15 carried by or representing a relatively rotating part.

The cam 13 is provided with a shank 16 journaled in a suitable frame or disk 17 relatively stationary and through which ordinarily the axle shaft 18 projects. The brake shoes are normally supported upon the disk 17 and cam 13 and are drawn toward each other or away from the flange of the brake drum by means of springs 19 extending from one shoe to the other and connected thereto by hooks 20. When the cam is rotated around the axis of the shank 16 by any suitable connections, (not shown) the edges or points of the cam bearing against the ends of the brake shoes force the exterior surfaces of the brake shoes into frictional contact with the brake drum. The brake shoes, therefore, are subjected to considerable friction and wear, and consequently after a certain amount of wear the cam becomes ineffective or loses its virtue, since the eccentricity of the cam points must not be excessive for the sake of maximum power.

In order to compensate for the wear upon the brake shoes and renew the effectiveness thereof without involving the expense for new brake shoes or the trouble of putting the same in place, we provide a simple expedient in the nature of a bushing 21 shown in detail in Fig. 3, the same being adapted to be slipped directly upon the cam 13 when the wheel is withdrawn so as to expose the brake, as indicated in Fig. 1. Our preferred form of bushing is constructed of metal of uniform thickness and in the nature of an open band having the general configuration of the exterior surface of the cam upon which it is adapted to be slipped. The opening is indicated at 22, one of the ends 23 being formed preferably with a concave edge while the opposite end 24 is formed with a convex edge conforming to the curvature of the end 23. In the formation, however, of the bushing, the end 24 tends to occupy a position closer to the central plane of the cam than the end 23, whereby this end 24 acts as a spring or gripping member in coöperation with the face of the cam. When, however, the bushing is slipped upon the cam the two ends 23 and 24 come substantially into registry with each other. We make these bushings in sets of different gage metal as, for example, but without unnecessarily limiting ourselves, of from one-sixteenth to three-sixteenths of an inch thickness. When the brake bands first begin to become ineffective, upon applying the thinnest bushing to the cam 13, the brake will immediately be made reliable again, for even though the thickness of the bushing be not very great, it is sufficient in view of the manner of construction and operation for the brake to overcome the defect, rendering the brake serviceable for any period of time, depending upon the amount of use to which it is put. After the thin bushing is no longer effective, one of a greater thickness may be substituted, which will again render the brakes serviceable and reliable.

The inner edge of the bushing, that is to say, the edge that is applied first to the outer end of the cam is preferably beveled, as indicated at 25, to facilitate the slipping thereof upon the cam. We prefer that the opening or joint in the bushing be so disposed as to be applied over or upon one of the idle points of the cam, that is to say, when the cam is rotated, as shown in Fig. 1, the joint portion of the bushing will be idle and moved away from the adjacent end of the brake shoe.

We claim:

1. The herein described bushing comprising an elliptical band of metal having a longitudinal opening at one side, one end of the band adjacent to the opening having a normal tendency to project toward the center of the band.

2. The herein described bushing for brake cams comprising an open elliptical member having along one side adjacent to one end of the ellipse a longitudinal opening providing two registering ends, one of which is concave and the other convex, one of said ends having a normal tendency to occupy a position closer to the center of the bushing than the other.

JOHN ISAAC DEVOE BRISTOL.
HORACE KEELER CURTIS.
LOUIS TYLER HUNTER.